United States Patent
Qiu

(10) Patent No.: US 10,657,151 B2
(45) Date of Patent: May 19, 2020

(54) METHOD AND APPARATUS FOR COMMUNICATION BETWEEN BLOCKCHAIN NODES

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/040,376

(22) Filed: Jul. 19, 2018

(65) Prior Publication Data

US 2019/0034459 A1    Jan. 31, 2019

(30) Foreign Application Priority Data

Jul. 26, 2017   (CN) .......................... 2017 1 0616370

(51) Int. Cl.
*G06F 16/27* (2019.01)
*H04L 9/32* (2006.01)
*H04L 12/24* (2006.01)
*H04L 29/06* (2006.01)

(52) U.S. Cl.
CPC ............ *G06F 16/27* (2019.01); *H04L 9/3239* (2013.01); *H04L 9/3265* (2013.01); *H04L 9/3271* (2013.01); *H04L 41/12* (2013.01); *H04L 63/0869* (2013.01); *H04L 2209/38* (2013.01)

(58) Field of Classification Search
CPC ...................................................... G06F 16/27
See application file for complete search history.

(56) References Cited

U.S. PATENT DOCUMENTS

| 2010/0142410 A1* | 6/2010 | Huynh Van ......... H04L 12/4633 370/255 |
| 2013/0007442 A1 | 1/2013 | Mao et al. |
| 2016/0217436 A1 | 7/2016 | Brama |
| 2016/0292672 A1 | 10/2016 | Fay et al. |
| 2017/0132630 A1 | 5/2017 | Castinado et al. |

(Continued)

FOREIGN PATENT DOCUMENTS

| CN | 1610319 | 4/2005 |
| CN | 101577973 | 11/2009 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Nicholas P Celani
(74) *Attorney, Agent, or Firm* — Fish & Richardson P.C.

(57) ABSTRACT

A communication request sent by a second node in a blockchain network is received by a first node in the blockchain network. Whether the second node has a mapping relationship with the first node is determined by the first node. A communication connection to the second node is established by the first node in response to determining that the second node has a mapping relationship with the first node. Establishment of a communication connection to the second node is refused by the first node in response to determining that the second node does not have a mapping relationship with the first node.

9 Claims, 6 Drawing Sheets

(56) References Cited

U.S. PATENT DOCUMENTS

| | | |
|---|---|---|
| 2017/0140375 A1 | 5/2017 | Kunstel |
| 2017/0345011 A1 | 11/2017 | Salami et al. |
| 2018/0020324 A1 | 1/2018 | Beauford |
| 2018/0097638 A1* | 4/2018 | Haldenby ............... H04L 9/14 |
| 2018/0097779 A1 | 4/2018 | Karame et al. |
| 2018/0139056 A1* | 5/2018 | Imai ................. H04L 9/3247 |
| 2018/0139278 A1 | 5/2018 | Bathen et al. |
| 2018/0183586 A1* | 6/2018 | Bhargav-Spantzel ................. H04L 9/0861 |
| 2019/0207767 A1 | 7/2019 | Ahn |

FOREIGN PATENT DOCUMENTS

| | | |
|---|---|---|
| CN | 106301792 | 1/2017 |
| CN | 106789089 | 5/2017 |
| CN | 106789920 | 5/2017 |
| EP | 3054405 | 8/2016 |
| JP | 2010520518 | 6/2010 |
| KR | 20140026619 | 3/2014 |
| KR | 20160150278 | 12/2016 |
| KR | 20170040079 | 4/2017 |
| WO | WO 2017079214 | 5/2017 |

OTHER PUBLICATIONS

Nakamoto, "Bitcoin: A Peer-to-Peer Electronic Cash System," www.bitcoin.org, 2005, 9 pages.

Hardjono et al., "Verifiable Anonymous Identities and Access Control in Permissioned Blockchains," Manuscript in Preparation, 2016, 9 pages.

International Search Report and Written Opinion in International Application No. PCT/US2018/043914, dated Oct. 18, 2018.

NEO Documentation [online], "Consensus," Jul. 2017, [retrieved on Oct. 10, 2018], retrieved from: URL<http://docs.neo.org/en-us/basic/consensus/consensus.html>, 9 pages.

International Preliminary Report on Patentability Ch. II in International Application No. PCT/US2018/043914, dated Oct. 17, 2019, 19 pages.

* cited by examiner

METHOD AND APPARATUS FOR COMMUNICATION BETWEEN BLOCKCHAIN NODES

CROSS-REFERENCE TO RELATED APPLICATIONS

This application claims priority to Chinese Patent Application No. 201710616370.1, filed on Jul. 26, 2017, which is hereby incorporated by reference in its entirety.

TECHNICAL FIELD

The present application relates to the field of information technologies, and in particular, to a method and apparatus for communication between blockchain nodes.

BACKGROUND

As a branch of blockchain technology, consortium blockchain technology is being widely applied on an increasing basis. Blockchain nodes in a consortium blockchain network include service nodes and consensus nodes. The service node participates in a service, and the consensus node is responsible for receiving service data sent by the service node and performing consensus verification on the service data.

The previous service node is actually a service server of each institution that joins the consortium blockchain network, and the software used to communicate with another node in the consortium blockchain network is installed on the server (the software is referred to as a communication program in the present application). If two nodes have a fixed service relationship, the two nodes can separately locally store the service relationship (the service relationship is referred to as a mapping relationship in the present application).

FIG. 1 is an architectural diagram illustrating a consortium blockchain network. As shown in FIG. 1, the solid circles are consensus nodes, and the hollow circles are service nodes. Different service nodes provide services for different applications (APPs). The service node sends service data generated by the APP to the consensus node for consensus verification. Assuming that a service node is a server corresponding to a catering application, and another service node is a server corresponding to a payment application. A user can pay through the payment application after ordering through an APP corresponding to the catering application; the two service nodes participate in a same service and can register a service relationship shown in FIG. 1 with the consortium blockchain network.

In the consortium blockchain network, each service node stores service data of its participating service, and the service data usually includes the user's private data. Based on the existing technology, a more secure communication method is needed.

SUMMARY

Implementations of the present application provide a method and apparatus for communication between blockchain nodes so as to resolve a problem that a user's private data in service data stored in a service node is prone to leakage.

To resolve the previous technical problem, the implementations of the present application are implemented as described below.

The implementations of the present application provide a method for communication between blockchain nodes, where the blockchain nodes in a blockchain network include service nodes. The service nodes participating in a same service have a mapping relationship, and the method includes the following: receiving a communication request sent by a second blockchain node by a first blockchain node; determining whether the second blockchain node has a mapping relationship with the first blockchain node; and if yes, establishing a communication connection to the second blockchain node; or otherwise, refusing to establish a communication connection to the second blockchain node.

The implementations of the present application provide an apparatus for communication between blockchain nodes, where the blockchain nodes in a blockchain network include service nodes. The service nodes participating in a same service have a mapping relationship, and the apparatus includes the following: a receiving module, configured to receive a communication request sent by a second blockchain node; and a determining and processing module, configured to determine whether the second blockchain node has a mapping relationship with the apparatus; and if yes, establish a communication connection to the second blockchain node; or otherwise, refuse to establish a communication connection to the second blockchain node.

The implementations of the present application provide a device for communication between blockchain nodes, where the device includes one or more processors and a memory. The memory stores a program, and the program is executed by the one or more processors to perform the following steps: receiving a communication request sent by a second blockchain node; determining whether the second blockchain node has a mapping relationship with the device; and if yes, establishing a communication connection to the second blockchain node; or otherwise, refusing to establish a communication connection to the second blockchain node; where blockchain nodes in a blockchain network include service nodes, and the service nodes participating in a same service have a mapping relationship.

In the implementations of the present application, it can be seen from the previous technical solutions provided in the implementations of the present application that before a communication connection is established between two service nodes, a service node requests to perform communication verifies an identity of a service node requesting to perform communication. A communication connection can be established between the two service nodes only when the service node requests to perform communication and when the service node requesting to perform communication participates in a same service. Therefore, a communication connection is not established between service nodes that do not participate in a same service, and the service nodes cannot steal service data stored in a service node participating in the service through a communication program, thereby ensuring security of private data in the service data.

BRIEF DESCRIPTION OF DRAWINGS

To describe technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

In a consortium blockchain network, service data generated by a service node participating in a service includes the user's private data. Therefore, to prevent the user's private data from being leaked to a service node that does not participate in the service, each service node stores only service data of its participating service in the consortium blockchain network.

However, an actual application for a service, for example, a service node A that does not participate in the service, can establish a communication connection to a service node B participating in the service through a communication program, and it can use a technical means (such as database cracking) to steal service data stored in service node B. That is, each service node that establishes a communication connection through a communication program can use a technical means to obtain service data stored in another service node that establishes a communication connection to the service node. Because service data can include the user's private data, the present application provides a more secure communication technology solution.

To make a person skilled in the art better understand the technical solutions in the present application, the following clearly and completely describes the technical solutions in the implementations of the present application with reference to the accompanying drawings in the implementations of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 2:
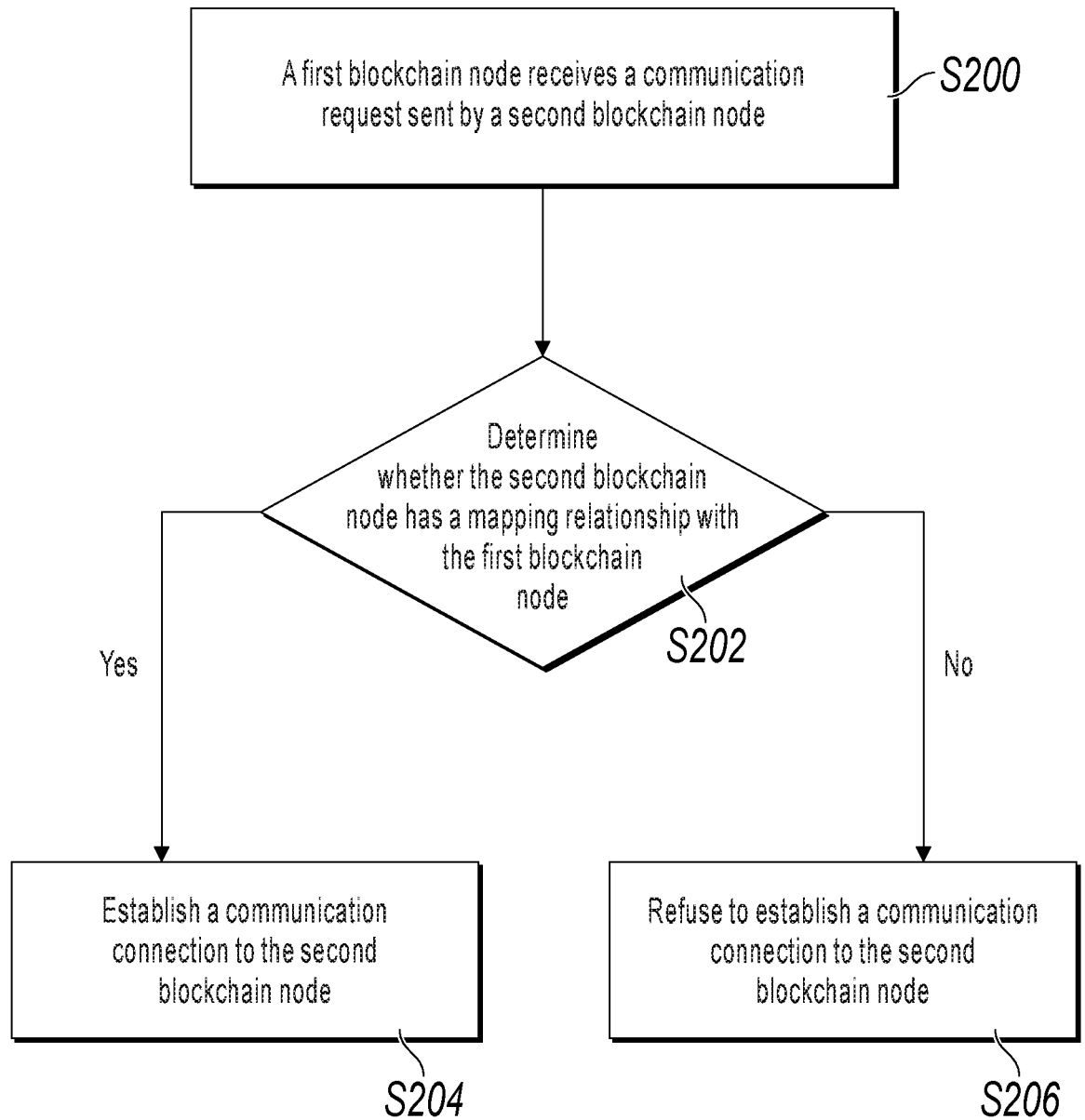
FIG. 2 is a flowchart illustrating a method for communication between blockchain nodes, according to an implementation of the present application.

FIG. 2 is a flowchart illustrating a method for communication between blockchain nodes, according to an implementation of the present application. The method includes the steps below.

S200. A first blockchain node receives a communication request sent by a second blockchain node.

Figure 1:
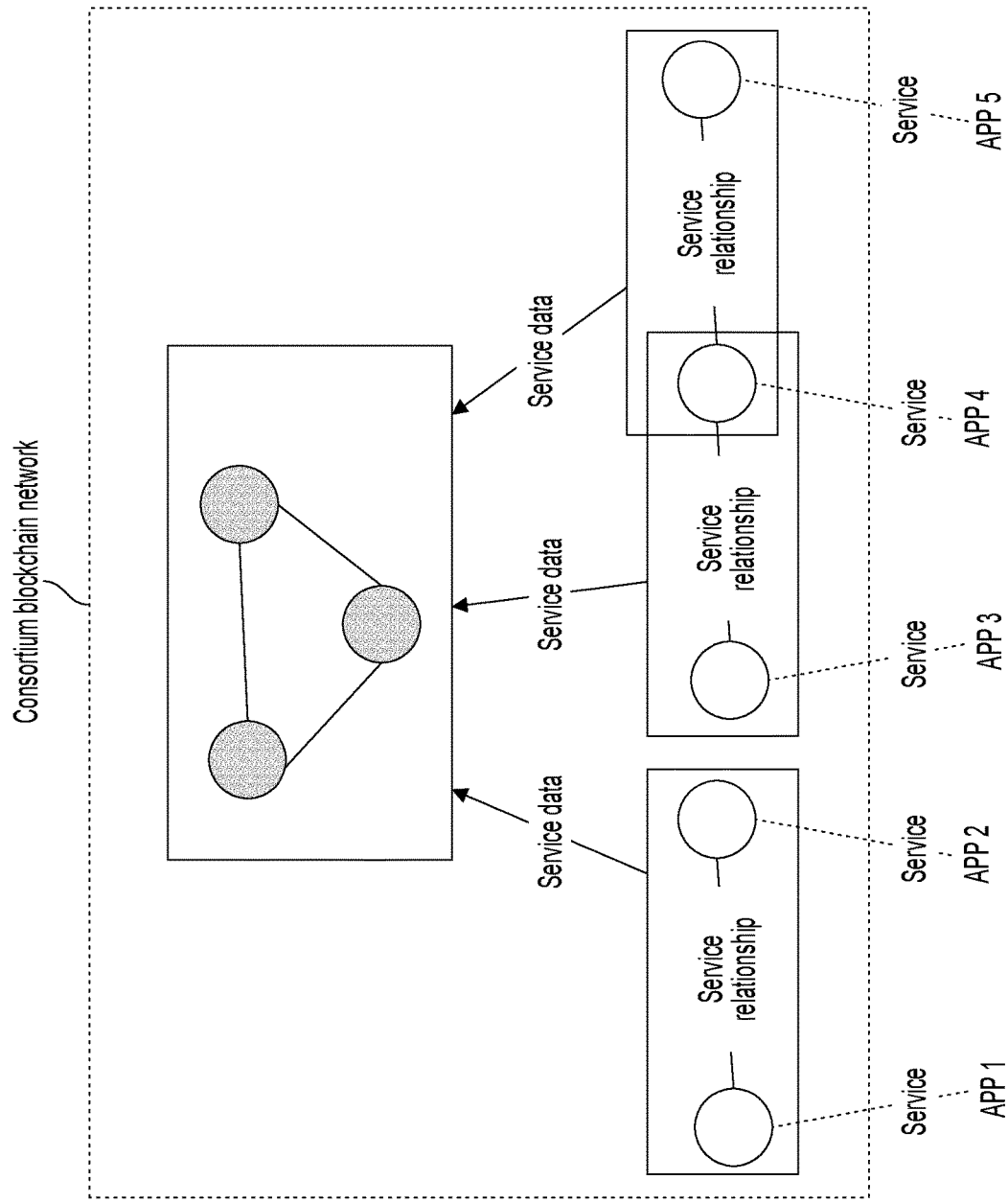
FIG. 1 is an architectural diagram illustrating a consortium blockchain network.

An application scenario of one or more implementations of the present application is a blockchain network, and the blockchain nodes include service nodes. A service node can be a server of an institution that participates in a service, and the service nodes exchange data through an installed communication program to execute a service. Service nodes participating in a same service have a service relationship shown in FIG. 1. In the present application, the service relationship between the service nodes is a mapping relationship between the blockchain nodes. Therefore, a mapping relationship between the service nodes is actually a service relationship between the service nodes.

In this implementation of the present application, the first blockchain node is a blockchain node requested to establish a communication connection, and the second blockchain node is a blockchain node requesting to establish a communication connection.

S202. Determine whether the second blockchain node has a mapping relationship with the first blockchain node; and if yes, perform step S204; or otherwise, perform step S206.

S204. Establish a communication connection to the second blockchain node.

S206. Refuse to establish a communication connection to the second blockchain node.

When both the first blockchain node and the second blockchain node are service nodes, the first blockchain node that receives the communication request verifies the second blockchain node that sends the communication request. If the first blockchain node has a mapping relationship with the second blockchain node, it indicates that the first blockchain node and the second blockchain node participate in a same service, and the first blockchain node can establish a communication connection to the second blockchain node. However, if the first blockchain node does not have a mapping relationship with the second blockchain node, it indicates that the first blockchain node and the second blockchain node participate in different services, and the first blockchain node can refuse to establish a communication connection to the second blockchain node. It should be noted that the previous execution logic can be pre-configured in a communication program installed on each blockchain node.

Further, the blockchain nodes can include consensus nodes, and a consensus node is responsible for performing consensus verification on service data generated by a service node participating in a service. For each service node, a consensus node that performs consensus verification on service data generated by the service node can have a mapping relationship with the service node. In addition, for each service node, different consensus nodes that perform consensus verification on service data generated by the service node can also have a mapping relationship.

Therefore, when both the first blockchain node and the second blockchain node are consensus nodes, or when the first blockchain node is a service node and the second blockchain node is a consensus node (or when the first blockchain node is a consensus node and the second blockchain node is a service node), the first blockchain node can verify whether the second blockchain node has a mapping relationship with the first blockchain node, so as to determine whether the first blockchain node should establish a communication connection to the second blockchain node.

Obviously, the service data stored in service nodes participating in a same service is service data of the same service, and there is no risk of private data leakage between the two service nodes. Likewise, the consensus nodes that perform consensus verification on a same service do not need to steal service data from each other, and a consensus node that performs consensus verification on service data generated by a service node does not need to steal the service data stored in the service node either. Therefore, a communication connection can be established between blockchain nodes (regardless of service nodes or consensus nodes) having a mapping relationship, and there is no risk of private data leakage.

It should be noted that each blockchain node (regardless of a service node or a consensus node) can configure a list of blockchain nodes that have a mapping relationship with the blockchain node, that is, the blockchain nodes that the blockchain node trust can establish a communication connection to the blockchain node.

In addition, when the first blockchain node determines that the second blockchain node has a mapping relationship with the first blockchain node, the first blockchain node can send a verification request to the second blockchain node, so that the second blockchain node determines whether the first blockchain node has a mapping relationship with the second blockchain node based on the verification request. If yes, the second blockchain node establishes a communication connection to the first blockchain node; or otherwise, the second blockchain node refuses to establish a communication connection to the first blockchain node.

As such, bidirectional verification between the two blockchain nodes that need to establish a communication connection can be implemented, so that the first blockchain node determines that the second blockchain node is trusted. The second blockchain node determines that the first blockchain node is trusted, and the communication security is further enhanced.

Certainly, the first blockchain node can send the verification request to the second blockchain node after receiving the communication request sent by the second blockchain node. The second blockchain node can use the same method to determine whether to establish a connection to the first blockchain node.

In the method shown in FIG. 2, before a communication connection is established between two service nodes, a service node requests to perform communication verifies an identity of the service node requesting to perform communication. A communication connection can be established between the two service nodes only when the service node requests to perform communication and when the service node requesting to perform communication participates in a same service. Therefore, a communication connection is not established between service nodes that do not participate in a same service, and a service node that does not participate in a service cannot steal service data stored in a service node participating in the service through a communication program, thereby ensuring security of private data in the service data.

In addition, in an existing blockchain network, especially in an existing consortium blockchain network, communication between blockchain nodes is usually based on the Transport Layer Security (TLS) protocol. Generally, each blockchain node holds a certificate issued by a trusted certificate authority (CA), and the certificate includes a signature of the CA in addition to attribute information of the blockchain node (a server) (for example, names of the country, province, city, and institution to which the server belongs, and a domain name of the server). Based on the TLS protocol, two blockchain nodes that need to establish a communication connection need to exchange their certificates to verify that their identities are authenticated by the CA (the certificates include CA signatures); and the two blockchain nodes can establish a communication connection if their identities are valid. Obviously, the existing TLS protocol cannot prevent establishment of a communication connection between blockchain nodes that have valid identities, but do not have a mapping relationship.

One or more implementations of the present application can be implemented based on the TLS protocol. However, for each blockchain node, when the blockchain node applies to the CA for a certificate, the blockchain node should provide a node identifier of the blockchain node to the CA so that the CA can add the node identifier of the blockchain node to the certificate of the blockchain node. The node identifier of the blockchain node is a unique identifier of the blockchain node and can be a number of the blockchain node.

Therefore, each blockchain node can store a node identifier of a blockchain node that has a mapping relationship with the blockchain node. In step S200 shown in FIG. 1, the first blockchain node can receive a communication request sent by the second blockchain node that includes a certificate of the second blockchain node. In step S202, the first blockchain node can obtain a node identifier from the certificate of the second blockchain node and determine whether the obtained node identifier has a mapping relationship with a node identifier of the first blockchain node.

Figure 3:
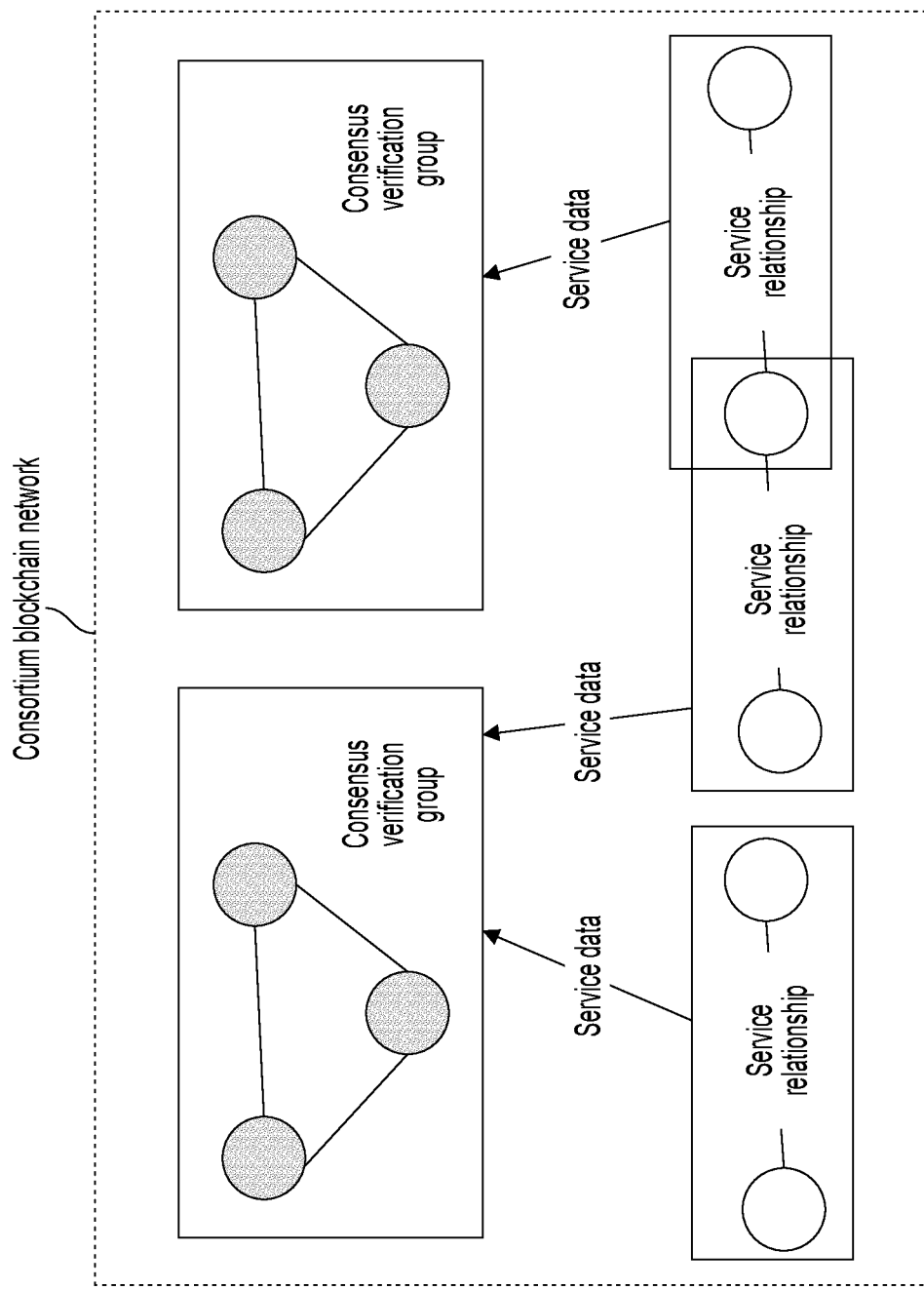
FIG. 3 is a schematic architectural diagram illustrating another consortium blockchain network.

FIG. 3 is a schematic architectural diagram illustrating another consortium blockchain network. As shown in FIG. 3, a plurality of services and consensus verification groups can exist in the consortium blockchain network, and the consensus verification groups are responsible for verifying different services. In this architecture, a certificate issued by the CA for a service node can further include a service identifier of a service in which the service node participates, and a certificate issued by the CA for a consensus node can further include a group identifier of a consensus verification group where the consensus node belongs.

Each service node can further store a service identifier of its participating service, and each consensus node can further store a group identifier of a consensus verification group including the consensus node. Therefore, the service node can determine whether the blockchain node has a mapping relationship with the service node based on a certificate of a blockchain node requesting to communicate with the service node; and the consensus node can determine whether the blockchain node has a mapping relationship with the consensus node based on a certificate of a blockchain node requesting to communicate with the consensus node. In this case, it should be noted that each time a first blockchain node performs verification, the first blockchain node traverses service identifiers and group identifiers stored in the first blockchain node to determine whether a service identifier or a group identifier in a certificate of a second blockchain node exists.

Further, when the CA issues a certificate for more than one blockchain node in a blockchain network, the CA can add a network identifier of the blockchain network including the blockchain node to the certificate of the blockchain node. Therefore, when determining that a network identifier in the certificate of the second blockchain node is different from a network identifier of a blockchain network including the first blockchain node, the first blockchain node can refuse to establish a communication connection to the second blockchain node without performing further verification.

It can be seen that in this implementation of the present application, a certificate of a blockchain node can include more fields (such as the previous node identifier, service identifier, group identifier, and network identifier) for indicating an identity of the blockchain node in a blockchain network.

Finally, it should be noted that one or more implementations of the present application may not be based on the TLS protocol, but a communications protocol is specified and built in a communication program corresponding to the blockchain network. The communications protocol is not limited in the present application, provided that the communications protocol can implement the steps shown in FIG. 2.

Figure 4:
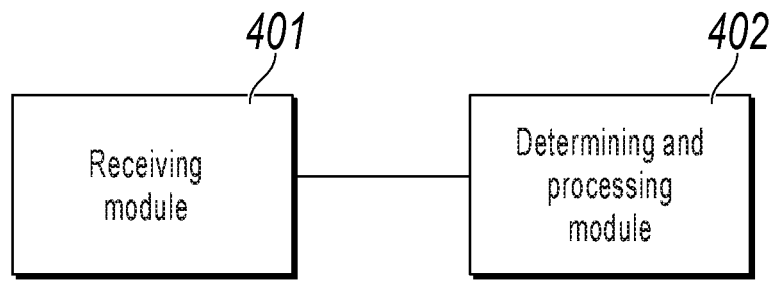
FIG. 4 is a schematic diagram illustrating an apparatus for communication between blockchain nodes, according to an implementation of the present application.

Based on the method for communication between blockchain nodes shown in FIG. 2, an implementation of the present application further provides an apparatus for communication between blockchain nodes, as shown in FIG. 4. Blockchain nodes in a blockchain network include service nodes, and service nodes participating in a same service have a mapping relationship. The apparatus includes the following: a receiving module 401, configured to receive a communication request sent by a second blockchain node; and a determining and processing module 402, configured to determine whether the second blockchain node has a mapping relationship with the apparatus; and if yes, establish a communication connection to the second blockchain node; or otherwise, refuse to establish a communication connection to the second blockchain node.

The blockchain node further includes a consensus node. For each service node, a consensus node that performs consensus verification on service data generated by the service node has a mapping relationship with the service node; and/or for each service node, consensus nodes that perform consensus verification on service data generated by the service node have a mapping relationship.

The receiving module 401 receives a communication request sent by the second blockchain node that includes a certificate of the second blockchain node.

The certificate of the second blockchain node includes a node identifier of the second blockchain node.

The determining and processing module 402 obtains the node identifier from the certificate of the second blockchain node, and determines, based on the obtained node identifier, whether the obtained node identifier has a mapping relationship with a node identifier of the apparatus.

The determining and processing module 402 sends a verification request to the second blockchain node, so that the second blockchain node determines whether the apparatus has a mapping relationship with the second blockchain node based on the verification request; and if yes, the second blockchain node establishes a communication connection to the apparatus; or otherwise, the second blockchain node refuses to establish a communication connection to the apparatus.

Based on the module training method shown in FIG. 2, an implementation of the present application further provides a device for communication between blockchain nodes. The device includes one or more processors and a memory, the memory stores a program, and the program is executed by the one or more processors to perform the following steps: receiving a communication request sent by a second blockchain node; determining whether the second blockchain node has a mapping relationship with the device; and if yes, establishing a communication connection to the second blockchain node; or otherwise, refusing to establish a communication connection to the second blockchain node.

Blockchain nodes in a blockchain network include the service nodes, and the service nodes participating in a same service have a mapping relationship.

Figure 5:
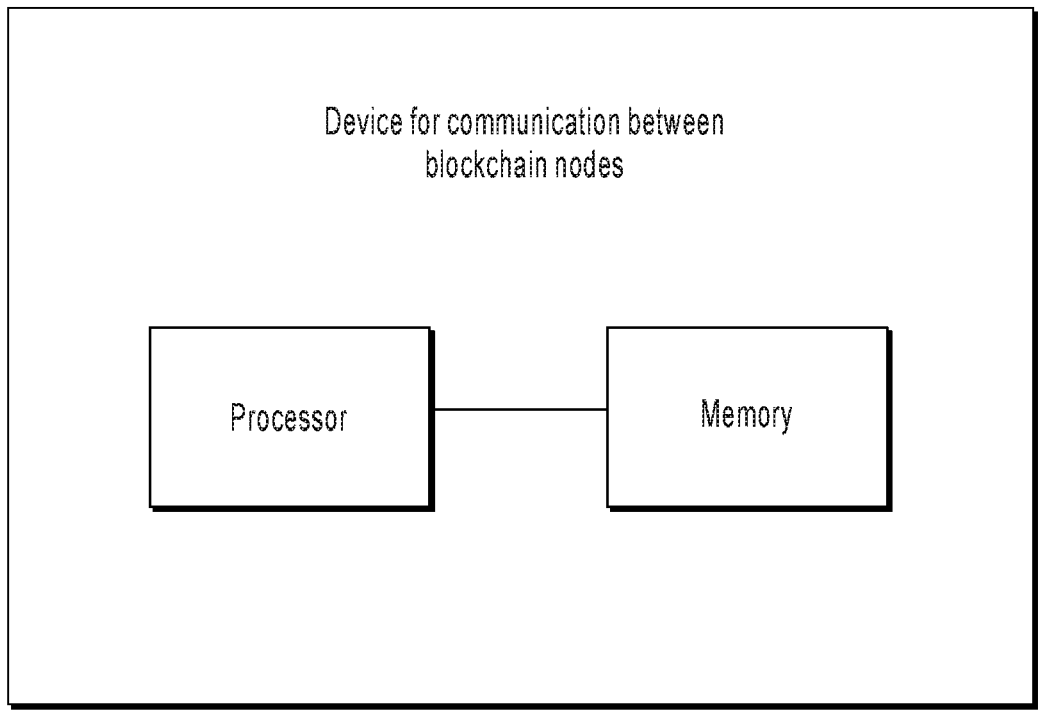
FIG. 5 is a schematic diagram illustrating a device for communication between blockchain nodes, according to an implementation of the present application.

The implementations in the present application are all described in a progressive manner. Mutual reference can be made to these implementations for same or similar parts in the implementations. Each implementation focuses on a difference between other implementations. Especially, the device for communication between blockchain nodes shown in FIG. 5 is basically similar to the method implementation, and therefore is described briefly. For related parts, refer to related descriptions in the method implementation.

In the 1990s, improvement of a technology can be clearly distinguished between hardware improvement (for example, improvement of circuit structures such as a diode, a transistor, and a switch) and software improvement (improvement of a method procedure). However, with the development of technologies, improvement of many method procedures can be considered as a direct improvement of a hardware circuit structure. Designers almost all program an improved method procedure to a hardware circuit to obtain a corresponding hardware circuit structure. Therefore, it cannot be said that an improvement of a method procedure cannot be implemented by using a hardware entity module. For example, a programmable logic device (PLD) (for example, a field programmable gate array (FPGA)) is a type of an integrated circuit. A logical function of the PLD is determined by component programming executed by a user. The designers perform programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specified programming language, which is referred to as hardware description language (HDL). There may be a plurality of HDLs, such as an Advanced Boolean Expression Language (ABEL), an Altera Hardware Description Language (AHDL), Confluence, a Cornell University Programming Language (CUPL), an HDCal, a Java Hardware Description Language (JHDL), a Lava, a Lola, a MyHDL, a PALASM, and a Ruby Hardware Description Language (RHDL). Currently, the very-high-speed Integrated Circuit Hardware Description Language (VHDL) and Verilog are most commonly used. A person skilled in the art should also understand that a method procedure only needs to be logically programmed, and programmed to the integrated circuit by using the previous hardware description languages, so that a hardware circuit that implements the logical method procedure can be easily obtained.

The controller can be implemented in any suitable manner. For example, the controller can be a microprocessor, a processor, a computer-readable medium storing computer-readable program code (for example, software or firmware) that can be executed by a (micro) processor, a logic gate, a switch, an application-specific integrated circuit (ASIC), a programmable logic controller, or an embedded microcontroller. Examples of the controller include but are not limited to the following microcontrollers: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented in a manner of computer-readable program code only, and the steps in the method can be logically programmed to enable the controller to further implement same functions in forms of a logical gate, a switch, an application-specific integrated circuit, a programmable logic controller, an embedded microcontroller, etc. Therefore, the controller can be considered as a hardware component, and an apparatus included in the controller and configured to implement various functions can also be considered as a structure in the hardware component. Alternatively, an apparatus configured to implement various functions can be considered as both a software module for implementing the method and a structure in a hardware component.

The system, the apparatus, the module, or the unit described in the previous implementations can be implemented by a computer chip or an entity, or implemented by a product with a specific function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is described by dividing the functions into various units. Certainly, when the present application is implemented, the functions of each unit can be implemented in one or more pieces of software and/or hardware.

A person skilled in the art should understand that one or more implementations of the present application can be provided as a method, a system, or a computer program product. Therefore, the one or more implementations of the present application can use a form of hardware only implementations, software only implementations, or implementations with a combination of software and hardware. In addition, the one or more implementations of the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product based on one or more implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions can be stored in a computer-readable memory that can instruct the computer or any other programmable data processing devices to work in a specific manner so that the instructions stored in the computer-readable memory can generate an artifact that includes an instruction apparatus. The instruction apparatus implements a specific function in one or more procedures in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more procedures in the flowcharts and/or in one or more blocks in the block diagrams.

In a typical configuration, a computing device includes one or more central processing units (CPUs), an input/output interface, a network interface, and a memory.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, a tape and disk storage or another magnetic storage device, or any other non-transmission media that can be configured to store information that a computing device can access. As described in the present application, the computer-readable medium does not include transitory computer-readable media (transitory media), such as a modulated data signal and a carrier.

It should be further noted that, the terms "include", "comprise", or any variants thereof are intended to cover a non-exclusive inclusion, so that a process, a method, a commodity, or a device that includes a list of elements not only includes those elements but also includes other elements which are not expressly listed, or further includes elements inherent to such process, method, commodity, or device. Without more constraints, an element described by the sentence "includes a . . . " further includes another identical element in the process, method, commodity, or device that includes the element.

A person skilled in the art should understand that one or more implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. for executing a particular task or implementing a particular abstract data type. The present application can also be practiced in distributed computing environments in which tasks are performed by remote processing devices that are connected by using a communications network. In the distributed computing environments, program modules can be located in both local and remote computer storage media including storage devices.

The previous implementations are merely implementations of the present application, and are not intended to limit the present application. A person skilled in the art can make various modifications and variations to the present application. Any modification, equivalent replacement, or improvement made without departing from the spirit and the principle of the present application shall fall within the scope of the claims of the present application.

Figure 6:
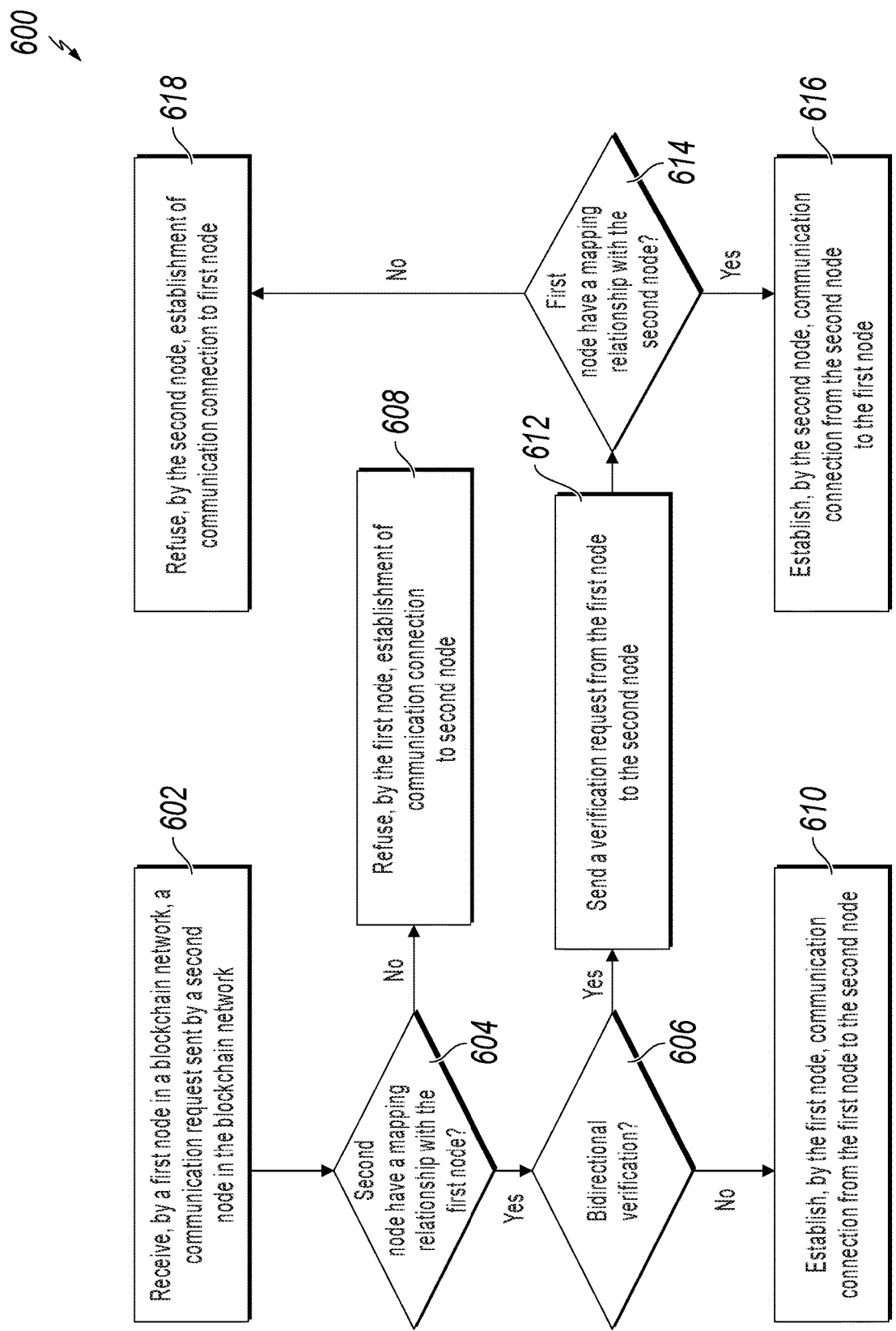
FIG. 6 is a flowchart illustrating an example of a computer-implemented method for communication between blockchain nodes, according to an implementation of the present disclosure.

FIG. 6 is a flowchart illustrating an example of a computer-implemented method 600 for communication between blockchain nodes, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

In general, before a communication connection is established between two nodes in a blockchain, one or both of the nodes requested to perform a communication can verify the identity of the other node prior to establishing the communication connection and allowing communication to occur. In particular, at least some of the nodes in the blockchain may be considered service nodes, where service nodes can be a server of an institution that participates in a service, and where the service nodes exchange data through an installed communication program to execute a service. Service nodes participating in a same service may be considered to have a service relationship, wherein the service relationship corresponds to a mapping relationship between the two service nodes. When two nodes in the blockchain participate in a same service, the two nodes are considered to have a mapping relationship, and may allow a communication connection to be established. If the two nodes do not participate in the same service, then the communication connection can be refused, potentially avoiding the sharing of unauthorized data between nodes that do not participate in the same service.

In some instances, the blockchain nodes may include consensus nodes, wherein consensus nodes are responsible for performing consensus verification on service data generated by a service node participating in a service. For each service node, a consensus node that performs the consensus verification on service data generated by that service node can be considered to have a mapping relationship with the service node. Additionally, for each service node, different consensus nodes that perform consensus verification on service data generated by the service node can also have a mapping relationship.

Turning to the illustrated of method 600, at 602, a first node in a blockchain network receives a communication request from a second node in the blockchain network. From 602, method 600 proceeds to 604.

At 604, a determination is made as to whether the second node has a mapping relationship with the first node. If it is determined that the second node does have a mapping relationship with the first node, then method 600 proceeds to 606. Otherwise, if it is determined that the second node does not have a mapping relationship with the second node, then method 600 proceeds to 608.

Determining whether the second node has a mapping relationship with the first node may be performed in various manners. In one instance, a general determination can be made as to whether the first node and the second node participate in the same or different services. If the two nodes participate in the same service, then a service relationship, which is a type of mapping relationship, exists between the nodes, and the mapping relationship is determined to exist. If the two nodes do not participate in the same service, but instead in different and non-overlapping services, then no mapping relationship between the nodes is determined to exist.

As noted previously, where both the first node and the second node are consensus nodes associated with a common service node, when the first node is a service node and the second node is a consensus node of the first node, or when the first node is a consensus node of the second node, then a mapping relationship is determined to exist between the nodes.

In some instances, a particular node in the blockchain, including both service nodes and consensus nodes, can configure, generate, maintain, or otherwise have access to a list of nodes that have a mapping relationship with that node. In other words, the particular blockchain node can store or use information identifying other nodes in the blockchain with which a trust relationship exists based on a mapping relationship. In one example, a particular node can store a node identifier of each node that has a mapping relationship to the particular node. The node identifier for each node may be included in or otherwise associated with a digital certificate that is issued for those nodes. For example, when a blockchain node applies to a certificate authority (CA) for a digital certificate, the blockchain node can provide a node identifier of the node to the CA so that the CA can add the node identifier of the blockchain node to the digital certificate of the blockchain node. The node identifier of the blockchain node can be a unique identifier of the blockchain node, and may be, in some instances, a number of the blockchain node. The particular node, therefore, can store the unique node identifiers of at least some of the other nodes to which the particular node has a mapping relationship. In those instances, determining whether a mapping relationship exists includes obtaining a node identifier of the requesting node (such as from a digital certificate of the requesting node included in the request) and determining whether the obtained node identifier is associated with a node that has a mapping relationship to the particular node.

In still other instances, the CA may issue digital certificates for service nodes, where the digital certificate includes a service identifier of a service in which the service node participates. Consensus nodes may also be issued digital certificates by the CA which can include a group identifier of a consensus verification group to which the consensus node belongs. Each service node can store or otherwise be associated with a service identifier of its participating service, and each consensus node can store a group identifier of a consensus verification group including the consensus node. Using that information, a service node can determine whether the blockchain node requesting the communication connection has a mapping relationship with the service node, and the consensus node can determine whether the blockchain node has a mapping relationship with the consensus node based on a certificate of a blockchain node requesting to communicate with the consensus node. In this case, it should be noted that each time a first blockchain node performs verification, the first blockchain node traverses service identifiers and group identifiers stored in the first blockchain node to determine whether a service identifier or a group identifier in a certificate of a second blockchain node exists.

Still further, when the CA issues a certificate for more than one blockchain node in a blockchain network, the CA can add a network identifier of the blockchain network including the blockchain node to the certificate of the blockchain node. Therefore, when determining that a network identifier in the certificate of the second blockchain node is different from a network identifier of a blockchain network including the first blockchain node, the first blockchain node can refuse to establish a communication connection to the second blockchain node without performing further verification.

In one implementation, a certificate of a blockchain node can include more fields (such as the node identifier, service identifier, group identifier, and network identifier) for indicating an identity of the blockchain node in a blockchain network.

At 608, after determining that no mapping relationship exists between the first node and the second node, the first node can refuse to establish a communication to the second node based on the determination. After 608, method 600 can stop.

As noted, when a mapping relationship is determined to exist between the first node and the second node, method 600 continues at 606. At 606, a determination is made as to whether a communication protocol of the blockchain requires bidirectional verification. If not, method 600 continues at 610, where the first node can establish the communication connection from the first node to the second node based on the determined mapping relationship. After 610, method 600 can stop. However, if bidirectional verification is required, method 600 proceeds to 612.

At 612, the first node can send a verification request from the first node to the second node. In response to the request, the second node performs a determination at 614 as to whether the first node has a mapping relationship to the second node. If so, the second node can node can establish a communication connection to the first node at 616, while if not, the second node can refuse the attempted communication connection to the first node at 618. By requiring bidirectional verification, the communication security within the blockchain can be improved and enhanced, ensuring that communications are allowed in both directions prior to establishing the communication connection. After 616 or 618, method 600 can stop.

In an existing blockchain network, such as an existing consortium blockchain network, communication between blockchain nodes can be based on the Transport Layer Security (TLS) protocol. Generally, each blockchain node holds a digital certificate issued by a trusted CA, and the digital certificate includes a signature of the CA in addition to attribute information of the blockchain node (a server) (for example, names of the country, province, city, and institution to which the server belongs, and a domain name of the server). Based on the TLS protocol, two blockchain nodes that need to establish a communication connection need to exchange their digital certificates to verify that their identities are authenticated by the CA (the certificates include CA signatures). The two blockchain nodes can establish a communication connection if their identities are valid.

Implementations of the described solution provide significant technical advantages. As service data stored in service nodes participating in a same service is service data of the same service, there is no risk of private data leakage between two service nodes where those service nodes participate in the same service. Similarly, consensus nodes that perform consensus verification on a same service do not need to steal service data from each other, and a consensus node that performs consensus verification on service data generated by a service node does not need to steal the service data stored in the service node either. Therefore, a communication connection can be established between blockchain nodes (regardless of service nodes or consensus nodes) having a mapping relationship, with no risk of private data leakage.

The described solutions can ensure that satisfactory relationships exist between nodes in a blockchain prior to establishing communication connections between the nodes. In doing so, communication security within the blockchain is increased by limiting allowed inter-nodal connections to those nodes with an existing mapping relationship. The existing mapping relationship may be based on the nodes participation in a common service, where service data associated with that service is already available to each node. As communication connections are not established, and are in fact refused, between service nodes that do not participate in a same service, service nodes that do not participate in a particular service cannot be used to steal or intercept service data stored in a service node participating in that particular service, thereby ensuring security of private data in the service data of the service.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for communication between blockchain nodes, wherein blockchain nodes in a blockchain network comprise service nodes, and service nodes participating in a same service have a mapping relationship, wherein the method comprises:
    receiving, by a first blockchain node, a communication request sent by a second blockchain node, wherein the communication request comprises a certificate of the second blockchain node,
    wherein the certificate of the second blockchain node comprises a plurality of identifiers, the plurality of identifiers comprising a node identifier of the second blockchain node, a network identifier, a previous node identifier, and either a service identifier or a group identifier;
    obtaining the plurality of identifiers from the certificate of the second blockchain node;
    determining, based on the plurality of identifiers, whether the second blockchain node has a mapping relationship with the first blockchain node; and
    establishing a communication connection to the second blockchain node when the second blockchain node is determined to have a mapping relationship with the first blockchain node or
    refusing to establish a communication connection to the second blockchain node when the second blockchain node is determined not to have a mapping relationship with the first blockchain node.

2. The method according to claim 1, wherein the blockchain nodes further comprise a plurality of consensus nodes;

for each service node, a corresponding consensus node that performs consensus verification on service data generated by the service node has a mapping relationship with the service node, and/or for each service node, different consensus nodes that perform consensus verification on service data generated by the service node have a mapping relationship.

3. The method according to claim 1, wherein the establishing the communication connection to the second blockchain node comprises:

sending a verification request to the second blockchain node, so that the second blockchain node determines, based on the verification request, whether the first blockchain node has a mapping relationship with the second blockchain node; and establishing, by the second blockchain node, a communication connection to the first blockchain node when the second blockchain node determines that the first blockchain node has a mapping relationship with the second blockchain node, or, otherwise, refusing, by the second blockchain node, to establish the communication connection to the first blockchain node when the second blockchain node fails to determine that the first blockchain node has a mapping relationship with the second blockchain node.

4. A device for communication between blockchain nodes in a blockchain network, the device is applied to a first blockchain node, wherein the device comprises one or more processors and one or more computer-readable memories coupled to the one or more processors and having instructions stored thereon that are executable by the one or more processors to perform operations comprising:

receiving a communication request sent by a second blockchain node, wherein the communication request comprises a certificate of the second blockchain node, wherein the certificate of the second blockchain node comprises a plurality of identifiers, the plurality of identifiers comprising a node identifier of the second blockchain node, a network identifier, a previous node identifier, and either a service identifier or a group identifier;

obtaining the plurality of identifiers from the certificate of the second blockchain node;

determining, based on the plurality of identifiers, whether the second blockchain node has a mapping relationship with the device; and establishing a communication connection to the second blockchain node When the second blockchain node is determined to have a mapping relationship with the device, or, refusing to establish a communication connection to the second blockchain node when the second blockchain node is determined not to have a mapping relationship with the device; wherein the blockchain nodes in the blockchain network comprise service nodes, and at least two service nodes participating in a same service have a mapping relationship.

5. The device of claim 4, wherein the blockchain nodes of the blockchain network further comprise a plurality of consensus nodes; and for each service node, a corresponding consensus node performs consensus verification on service data generated by the service node has a mapping relationship with the service node, and/or for each service node, different consensus nodes that perform consensus verification on service data generated by the service node have a mapping relationship.

6. The device of claim 4, wherein the operations further comprise sending a verification request to the second blockchain node, so that the second blockchain node determines, based on the verification request, whether the device has a mapping relationship with the second blockchain node; and establishing, by the second blockchain node, a communication connection to the device when the second blockchain node determines that the device has a mapping relationship with the second blockchain node, or otherwise, refusing, by the second blockchain node, to establish a communication connection to the device when the second blockchain node fails to determine that the device has a mapping relationship with the second blockchain node.

7. A non-transitory, computer-readable medium storing one or more instructions executable by a computer system to perform operations for communicating between blockchain nodes, wherein blockchain nodes in a blockchain network comprise service nodes, and service nodes participating in a same service have a mapping relationship, the operations comprising:

receiving, by a first blockchain node, a communication request sent by a second blockchain node, wherein the communication request comprises a certificate of the second blockchain node, wherein the certificate of the second blockchain node comprises a plurality of identifiers, the plurality of identifiers comprising a node identifier of the second blockchain node, a network identifier, a previous node identifier, and either a service identifier or a group identifier;

obtaining the plurality of identifiers from the certificate of the second blockchain node;

determining, based on the plurality of identifiers, whether the second blockchain node has a mapping relationship with the first blockchain node; and establishing a communication connection to the second blockchain node when the second blockchain node is determined to have a mapping relationship with the first blockchain node or refusing to establish a communication connection to the second blockchain node when the second blockchain node is determined not to have a mapping relationship with the first blockchain node.

8. The non-transitory, computer-readable medium of claim 7, wherein the blockchain nodes further comprise a plurality of consensus nodes;

for each service node, a corresponding consensus node that performs consensus verification on service data generated by the service node has a mapping relationship with the service node, and/or for each service node, different consensus nodes that perform consensus verification on service data generated by the service node have a mapping relationship.

9. The non-transitory, computer-readable medium of claim 7, wherein the establishing the communication connection to the second blockchain node comprises:

sending a verification request to the second blockchain node, so that the second blockchain node determines, based on the verification request, whether the first blockchain node has a mapping relationship with the second blockchain node; and establishing, by the second blockchain node, a communication connection to the first blockchain node when the second blockchain node determines that the first blockchain node has a mapping relationship with the second blockchain node, or, otherwise, refusing, by the second blockchain node, to establish the communication connection to the first blockchain node when the second blockchain node fails to determine that the first blockchain node has a mapping relationship with the second blockchain node.

* * * * *

UNITED STATES PATENT AND TRADEMARK OFFICE
CERTIFICATE OF CORRECTION

PATENT NO. : 10,657,151 B2
APPLICATION NO. : 16/040376
DATED : May 19, 2020
INVENTOR(S) : Honglin Qiu Page 1 of 1

It is certified that error appears in the above-identified patent and that said Letters Patent is hereby corrected as shown below:

In the Claims

In Claim 4, Column 17, Line 49 delete "When" and insert -- when --, therefor.

Signed and Sealed this
Seventh Day of July, 2020

Andrei Iancu
*Director of the United States Patent and Trademark Office*